Aug. 29, 1967   S. L. SINKOWITZ ET AL   3,338,513
POCKET BALANCE CERTIFIER
Filed April 25, 1966   4 Sheets-Sheet 1

INVENTORS
SOL L. SINKOWITZ
FRANK MORETTINI
BY
Briskin & Goldfarb
ATTORNEYS

Aug. 29, 1967  S. L. SINKOWITZ ET AL  3,338,513
POCKET BALANCE CERTIFIER

Filed April 25, 1966  4 Sheets-Sheet 2

INVENTORS
SOL L. SINKOWITZ
FRANK MORETTINI
BY
Brisbin & Goldfarb
ATTORNEYS

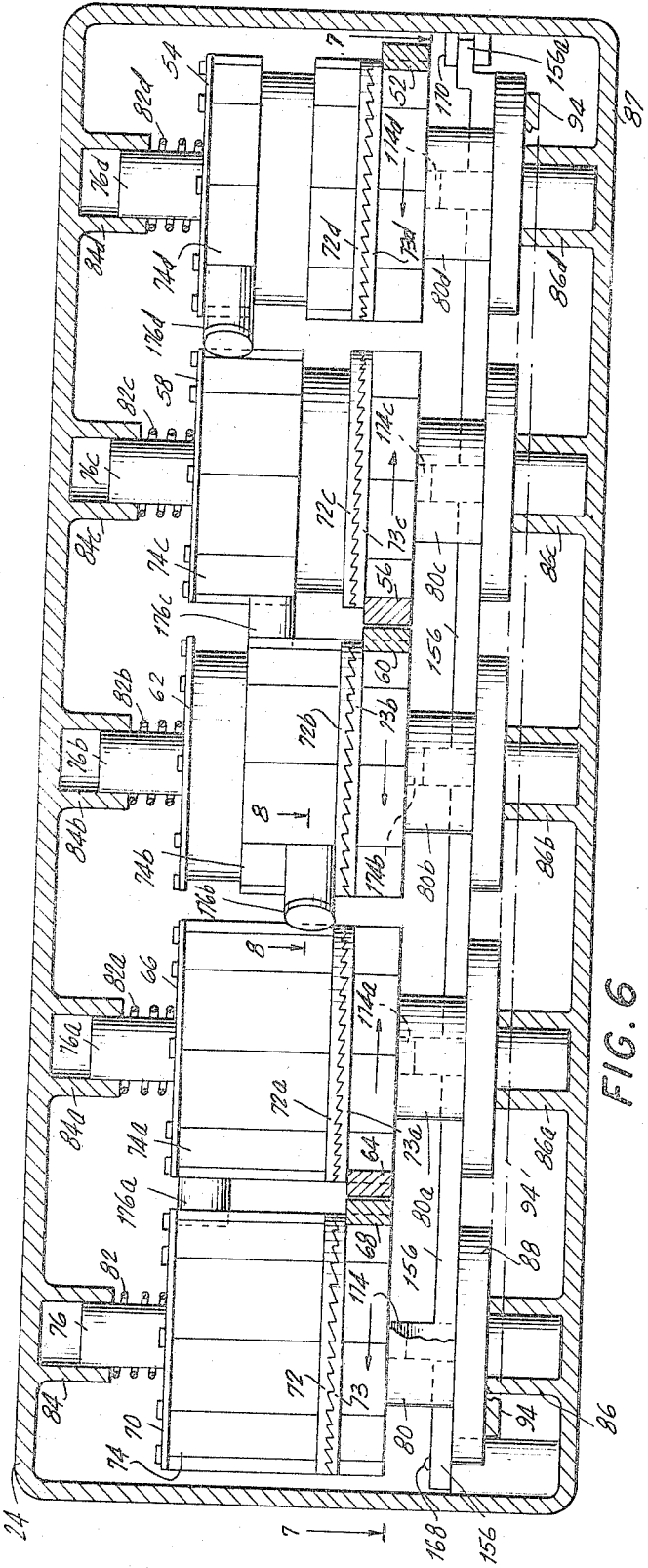

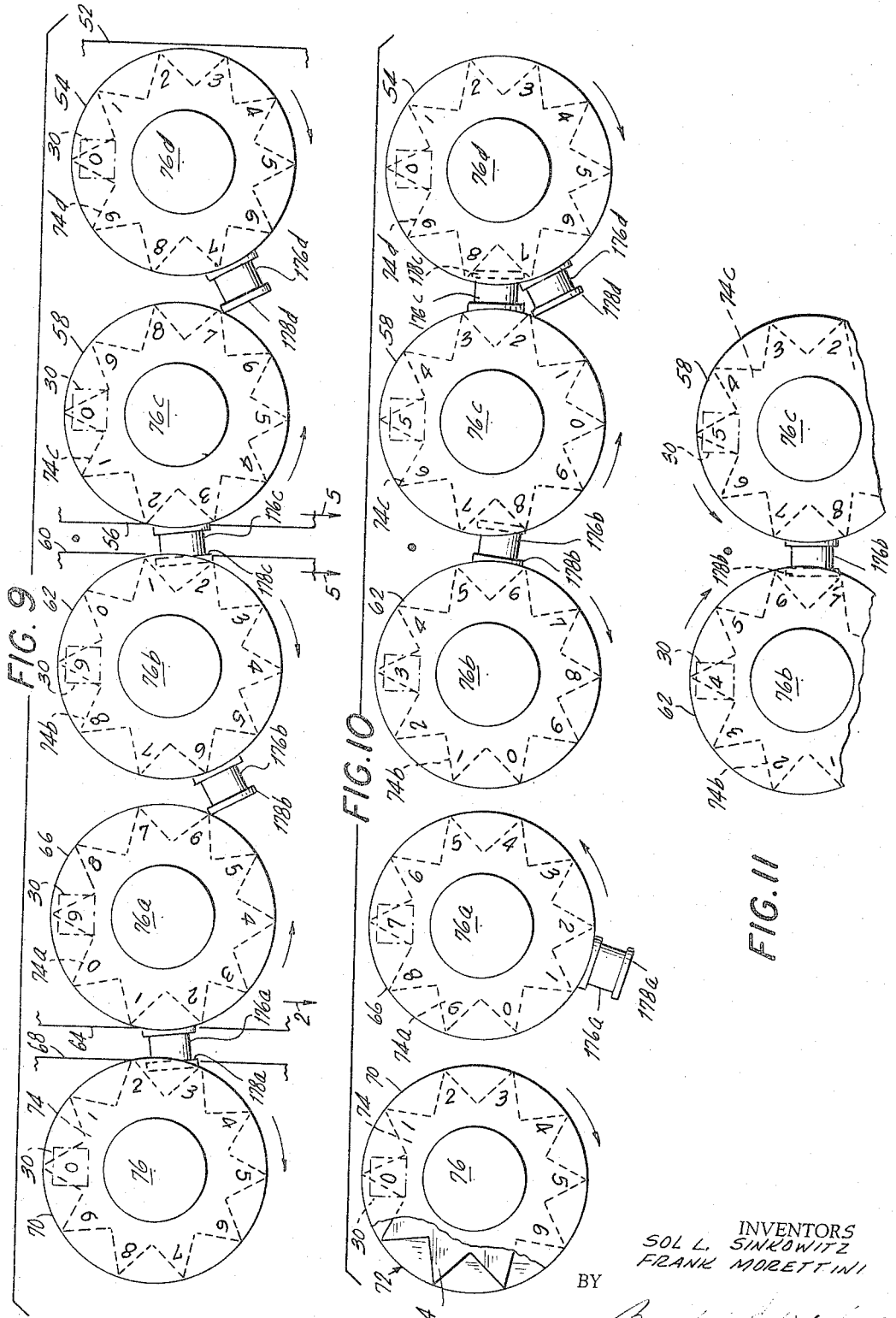

United States Patent Office 3,338,513
Patented Aug. 29, 1967

3,338,513
POCKET BALANCE CERTIFIER
Sol L. Sinkowitz, East Islip, N.Y., and Frank Morettini, Las Cruces, N. Mex.; said Sinkowitz assignor to Florence Sinkowitz, East Islip, N.Y.
Filed Apr. 25, 1966, Ser. No. 544,740
5 Claims. (Cl. 235—58)

ABSTRACT OF THE DISCLOSURE

A pocket check writing and balance computing device comprising a casing having a check amount indicating window and a balance indicating window formed in the upper surface of the casing. The casing further being provided with a check receiving slot therein and stamping bar means on the case for actuating the stamping mechanism. A plurality of slides located within the case for setting the amount of the check to be drawn, which slides can be moved in either direction while setting the amount to be drawn by check, the slides having digits on the upper surface thereof corresponding in registry to the amount indicating window. The pocket balance certifier further being provided with zero lock means which cooperate with the remainder indicating wheels to prevent the remainder indicating wheels from being sequenced beyond zero thereby preventing the drawing of a check for a greater amount than the balance remaining within the check account, the zero lock means comprised of a spring control slide bar actuatable within a fixed track and being pivoted on one end thereof.

---

The present invention relates generally to a check writing and balance computing device and in particular to a pocket balance certifier.

With the tremendous growth in the popularity of personal checking accounts and the use by housewives, laymen and the general public of checks as the means for payment of bills and the like, the need to accurately reflect the balance maintained in the checking account at all times has become evident.

Referring specifically to special checking accounts where no minimum balance is required, there is a likelihood of overdrawing the account for any of numerous possible reasons such as improper bookkeeping records. This often results in checks not clearing the bank due to the fact that there are not sufficient funds in the checking account.

Accordingly, it is an object of the present invention to provide a check writing and balance computing device which will be simple to operate, and will at all times accurately reflect the balance maintained in the checking account.

Further, it is an object of the present invention to provide a check writing and balance computing device which will actually prevent the depositor from drawing checks in excess of the amount of funds which is on deposit in their checking account.

Further, it is an object of the present invention to provide a check writing and balance computing device which will emboss a check with the amount for which the check is drawn, thereby rendering it difficult, if not impossible, for anyone to raise or change the amount of the check after it has been drawn by the writer.

Still further, it is an object of the present invention to provide a pocket balance certifier which is conveniently portable.

Further, it is an object of the present invention to provide a check writing and balance computing device which may be charged or preset by the bank in which the depositor maintains a checking account each time a deposit is made so as to insure that the depositor and the bank have an identical record indicating the amount of funds on deposit in the bank.

Still further, it is an object of the present invention to provide a check writing and balance computing device which will be lightweight, and easy to carry around so as to facilitate the convenience of the depositor in using his or her checking account.

Still further, it is an object of the present invention to provide a check writing and balance computing device which will be inexpensive to manufacture, attractive and have a minimum of moving parts which can go out of order.

Still further, it is an object of the present invention to provide a check writing and balance computing device which can be inexpensively mass produced so as to render the device attractive to banking institutions and depositors alike.

Still further, it is an object of the present invention to provide a lightweight, inexpensive and attractive check writing and balance computing device which will instill the receiver of the check with confidence that the amount for which the check has been drawn is actually on deposit in the depositor's account, thereby facilitating the acceptance of the checks drawn upon personal checking accounts.

These, together with the various ancillary objects and features of the invention will become apparent as the following description proceeds, are attained by this pocket balance certifier, a preferred embodiment of which has been illustrated in the accompanying drawings, by way of example only, wherein:

FIG. 6 is an enlarged vertical sectional view taken along the plane of line 6—6 in FIG. 3, showing the remainder indicator mechanism in detail;

FIG. 7 is a sectional detail view taken along the plane of line 7—7 in FIG. 6;

FIG. 8 is a sectional detail view of the remainder wheel indexing mechanism taken along the plane of line 8—8 in FIG. 6;

FIG. 9 is a schematic view of the remainder indicating wheels and indexing mechanism;

FIG. 10 is a schematic view of the remainder wheels showing a sequence of operation; and FIG. 11 illustrates remainder indicating wheels showing the manner of indexing.

Figure 1:
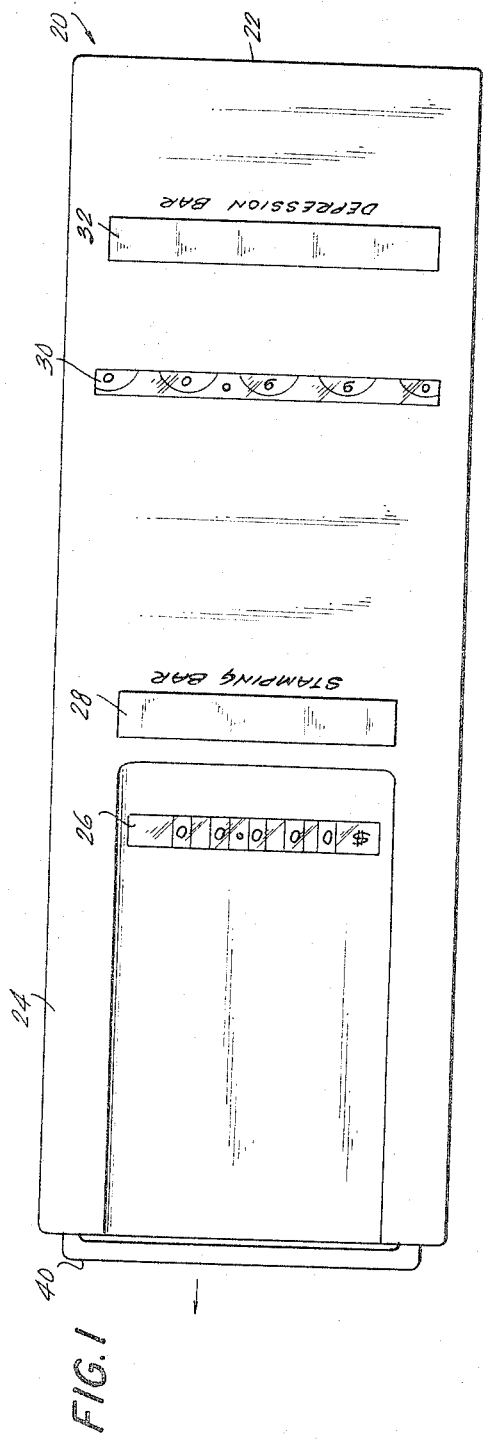
FIG. 1 is a top plan view of the pocket balance certifier comprising an embodiment of the present invention and showing the charging window, the stamping bar and the balance remainder indicating window.
Figure 2:
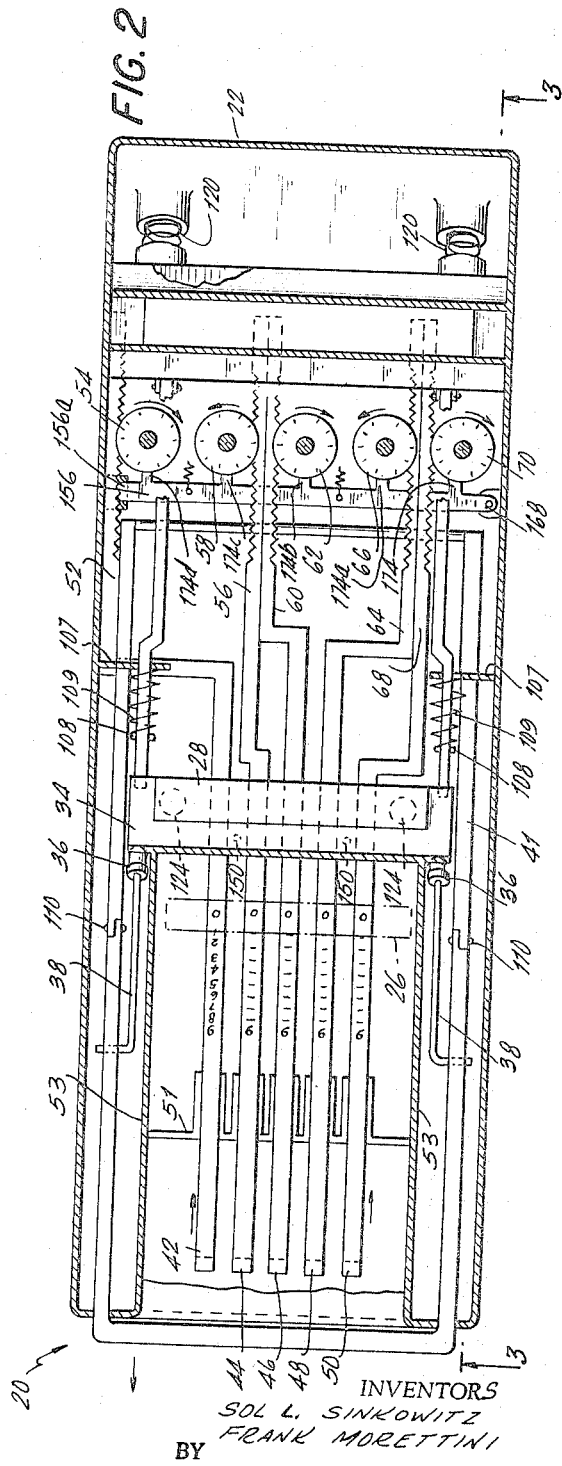
FIG. 2 is a top plan view of the check writing and balance computing device, the top removed showing the internal mechanism therein.

With continuing reference to the accompanying drawings wherein like reference numerals designate similar parts throughout the various views, and with initial attention to FIGS. 1 and 2, reference numeral 20 generally designates the pocket balance certifier comprising the present invention, which includes a case 22 within which the check writing and balance computing device is housed.

The case 22 is formed having a recessed window 26 located thereon through which the user of the check writing device can see the amount for which the check is to be written. A stamping bar 28 is located directly below the charging window 26 and is adapted to be depressed by the user to imprint the amount for which the check will be written upon the check and simultaneously to emboss the same upon the check. Directly below the stamping bar located near the closed end of the upper surface 24 is a remainder window 30 which is formed of a transparent material and through which the user can see the amount remaining in his checking account. Located directly below and in alignment with the remainder window 30 is the depression bar 32, the purpose of which will become apparent as the specification continues.

Figure 4:
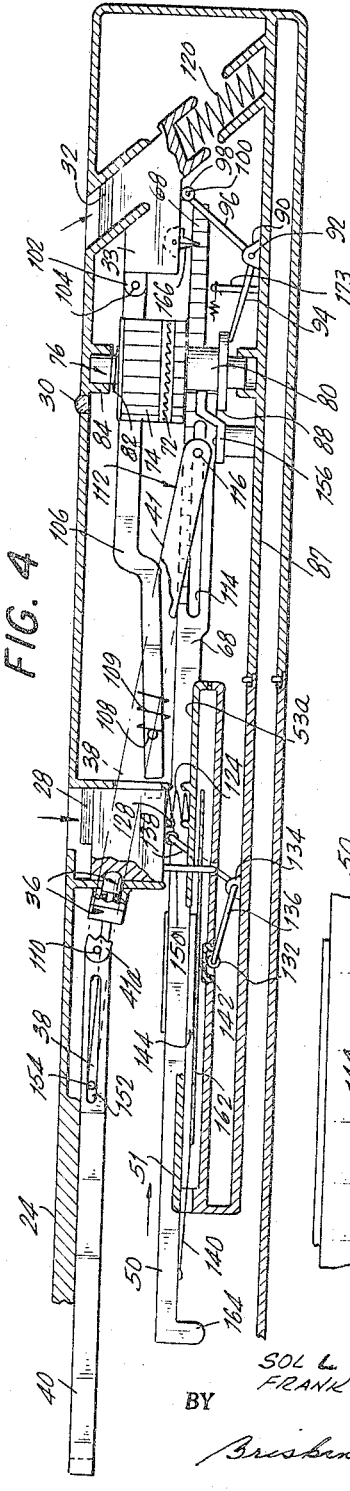
FIG. 4 is a vertical sectional view of the pocket balance certifier similar to FIG. 3 but showing the device in an operative position.
Figure 5:
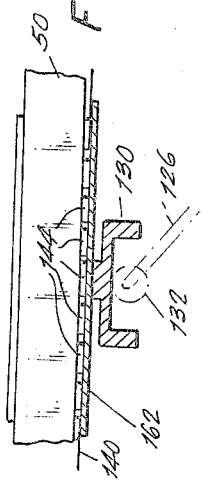
FIG. 5 is an enlarged detail view of the check printing and embossing mechanism.

Referring now specifically to FIG. 2, the charging window 26 is outlined in phantom lines. The stamping bar 28 which extends through the upper surface 24 of the housing 22 is a portion of the larger centering member 34. The stamping bar 28 is connected to a detent 36 which by means of linkage is connected to the clearing bar 40 which extends beyond the end of housing 22. A plurality of slides 42, 44, 46, 48, 50 are slidably secured in place by slide alignment bar 52 which is connected to the interior wall 54 of the case 22. The slides 42, 44, 46, 48 and 50 are accessible through a cutout or open portion in the end wall of the case 22 which open portion is located directly below the clearing bar 40. Slide 42 serves as the hundredths of a dollar or cents indicator and has numerals 0 through 9 provided thereon. Slide 44 serves as the tenth or 10 cent indicator; slide 46 serves as the dollar indicator; slide 48 as the ten dollar indicator and slide 50 as the hundred dollar indicator. Slide 42 is connected to or integrally formed with rack 52 which contacts the remainder indicating wheel 54. Slide 44 is connected to drive rack 56 which contacts remainder indicating wheel 58. Likewise slide 46 is connected to a gear drive rack 60 which contacts remainder indicating wheel 62. Slide 48 is provided with a drive rack 64 which contacts remainder indicating wheel 66 and in the same manner slide 50 is connected to a drive rack 68 which contacts remainder indicating wheel 70. The racks 52, 56, 60, 64 and 68 are adapted to coact as a gear and rack, and slip clutch with the base of the toothed remainder indicating wheels 54, 58, 62, 66 and 70 respectively. The actual engagement racks with the remainder indicating wheels is best seen in FIGS. 5 and 4 wherein the toothed portion 72 of the rack 68 extends upwardly from the upper surface thereof and contacts the base 74 of the remainder indicating wheel 70. The remainder indicating wheel and its base 74 are rotatably mounted about an axle or shaft 76 having an upper end 78 of a reduced diameter and a lower end 80 of an enlarged diameter. A spring 82 fits about the upper end 78 of the axle 76. The upper wall 24 of the casing is provided with bearing surface 84 which extends downwardly from the upper surface so as to encircle the upper edge of the axle 78. Likewise, the lower edge of the axle 78 fits into a bearing surface 86 which extends upwardly from the interior base 87 of the pocket balance certifier.

A hinged double arm lever 89 is pivotally connected to the interior base 87, at 90 by pivot pin 92, which double arm lever has a first arm 94 which is adapted to fit beneath and bear against a collar 88 while remaining arm 96 is pivotally connected at 98 to the depression bar extension 33 by pivot pin 100. The forward end of the depression bar extension 33 is pivotally connected at 102 by means of pivot pin 104 to a control lever 106 which serves as a stamping bar lock mechanism. The forward portion of the stamping bar lock mechanism fits into a slot in the stamping bar 28 to prevent the actuation of the stamping bar. When the depression bar 32 is depressed the stamping bar lock mechanism is withdrawn from the slot in the stamping bar 28 freeing the stamping bar 28 for actuation.

Figure 3:
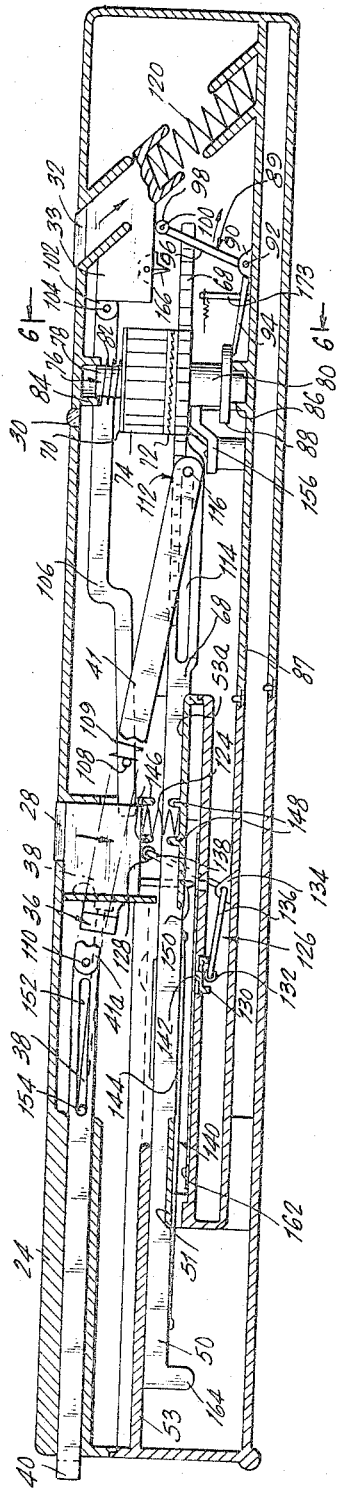
FIG. 3 is a vertical sectional view of the pocket balance certifier taken along the plane of line 3—3 of FIG. 2 in an initial position.

A clearing bar extension 41 is pivotally connected to the clearing bar 40 by pivot pin 110 at the forward end of the clearing bar extension 41a. The clearing bar extension 41 is further provided with a pin cooperating with the linkage 112 and slot 114 on the slide bar 68, which is connected to one end of the clearing bar lever extension 41. The pin 116 extends laterally from the interior side walls 54 of the check writing and balance computing device through each of the slides 42 through 50 for the purpose of clearing and resetting the slides after operation of the check write. A compression spring 120 is located at the rearward end of the check writing device to maintain the depression bar 32 in the upward position as indicated in FIG. 3. On operation of the clearing bar 40 the horizontal remainder indicating wheels 54, 58, 62, 66 and 70 are released leaving the proper total remaining.

The stamping bar mechanism 28 is maintained in an upward position by means of a compression spring 124. Attached to the stamping bar 28 is a double arm lever 126 which is connected at its opposite end to a check lifter 130 by means of a pin connection 132. The second arm 126 is further pivotally connected at 134 to the interior housing 84.

An enlarged detail view of the check lifter 130 is provided in FIG. 5 wherein there is seen the upper end of the double arm lever 126, and the check lifting and stamping device 130. The check lifting and stamping device 130 is provided with an upwardly extending contact surface 142 which upwardly extending contact surface is adapted to bear against the printing discs 144 which extend downwardly from the slide levers 42 through 50 and against the inking ribbon 140. A vertical extension 138 of the double arm lever 136 is connected to the stamping bar 28 at pivot connection 128 in such a manner as when the stamping bar 28 is depressed the double arm lever 136 causes the check lifter to rise upwardly, thereby maintaining a check in position within the check writer and at the same time bringing the upwardly extending control surface 142 into contact with the printing discs 144 of the slide levers 42 through 50.

The stamping bar 28 has formed at its lower edge a spring holding bearing surface 146 which is directly above and in alignment with a portion of the interior wall 53a. Extending upwardly from the interior wall 53a is a spring holding bearing surface 148. The compression spring 124 is maintained in position within the bearing surfaces 146, 148, in such a manner as to normally urge the stamping bar 28 in its upper position as shown in FIG. 3.

Connected to and located on the lower surface of the stamping bar 28 is a check securement pin 150 which serves to secure the check in position and prevent the check from moving during the actual stamping and embossing of the dollar amount for which the check is drawn upon the check surface.

Located on the clearing bar 40 at a point slightly in front of pivot pin 110 is a slot 152 within the clearing bar 40 which allows the clearing bar 140 to be advanced until the rearward edge of the slot 152 contacts the clearing bar limit 154 located at the forward end of the slot 152 when the clearing bar is in its normal position. Check insertion slot 160 is provided above the check lifting means 130 and below the securement pin 150. The check as shown is designated at 162.

Slide actuating means 42 through 50 are provided with limit means 164 to prevent the slide actuating means from being actuated beyond the point through which they are intended to travel.

Referring now specifically to FIG. 4 the pocket balance certifier is shown with the stamping bar 28 and the depression bar 32 in their depressed or operative position as they would be when a check is actually in the process of being written. It will be noted that in this position that the depression bar 32 is urged downwardly, compressing spring 120, to a point below the surface 24 of the check writing and balance computing device. In this position, the control lever 106 is lowered away from the upper surface 24 of the housing in such a manner as to cause the downwardly depending extension 166 which is pivotally mounted on the lower portion of the depression bar to engage the slide 50 in such a manner as to prevent the slide 50 from moving out of position during the stamping operation.

It will be further noted that the stamping bar 28 is also depressed thereby compressing spring 124 and simultaneously lowering the check locating and securement pin 150 in such a manner as to cause the check locating and securement pin 150 to grasp the check and prevent the check from moving. Simultaneously, when the stamping bar 28 is depressed, the double arm lever 126 is rotated about pivot 134 causing the check lifter 130 to rise thereby lifting the check 162 upwardly so that the upper surface of the check 162 contacts the inking ribbon 140 while simultaneously being printed and embossed.

Referring now specifically to the manner in which the check writing and balance computing device operates and in particular to the manner in which the balance is computed, specific reference is made to FIG. 6 to ascertain the method of operation which causes the check writing and balance computing device to actually reflect the amount remaining in the depositor's checking account.

The remainder indicating wheels 54, 58, 62, 66, 70 are located on the base sections 74, 74a, 74b, 74c and 74d which base sections have lower portions 72, 72a, 72b, 72c and 72d, toothed lower portions 73, 73a, 73b, 73c and 73d respectively, forming a one-way clutch mechanism with the racks 52, 56, 60, 64 and 58. Each of the remainder indicating wheels 54, 58, 62, 66 and 70 are located above the base portions 74, 74a, 74b, 74c, 74d respectively, which indicating wheels and base portions are located about the shafts 76, 76a, 76b, 76c and 76d. In the position illustrated in FIG. 6 the shafts are resting against the interior base 87 of the check writer within bearing surfaces 86, 86a, 86b, 86c, and 86d. The upper ends of the shafts 76 are located in the bearing surfaces 84, 84a, 84b, 84c and 84d at a point spaced from the upper surface. Compression springs 82, 82a, 82b, 82c and 82d urge the remainder indicating wheels 54, 58, 62, 66 and 70 downwardly so that the shaft 76 bears against the lower surface as illustrated. The collars 88, 88a, 88b, 88c, 88d are illustrated showing the zero lock bar 156 engaged in slot 168 on the shaft 76 and not yet engaged in the shafts 76a, 76b, 76c, 76d or the slots 158a, 158b, 158c, 158d. Shafts 76a, 76b, 76c and 76d will engage at such time as the remainder indicating wheels 54, 58, 62, 66 and 70 reach the zero numeral. The zero lock bar 156 is pivotally connected to one side of the housing at 168 while the free end 156a is located within a slot 170 which is located on the opposite side wall of the check writing and balance computer housing. Spring means 172 are attached to the rearward end of the housing at 173 so as to urge the zero lock bar against the shafts 76, 76a, 76b, 76c and 76d at such time as the slotted portion of the shafts line up with the zero numeral on the remainder wheel to prevent the calculating device from resetting thereby eliminating the possibility of a person overdrawing the account.

The zero lock bar 156 is provided with extensions 174, 174a, 174b, 174c and 174d which extensions are adapted to fit into the slotted portions 158, 158a, 158b, 158c and 158d of the shafts 74, 74a, 74b, 74c and 74d as the remainder indicating wheels rotate and reset to zero working from the highest number wheel in this case being the hundred dollar wheel, as illustrated, downwardly through the tens dollar wheel, the dollar wheel, the ten cent wheel and the cent wheel 70, 66, 62, 58 and 54 respectively. As a result of the pivotal angle connection of the zero lock bar 156, as the hundred dollar remainder indicating wheel 70 comes to zero, the extension 174 of the zero lock bar 156 will slip in and lock in slot 158 of shaft 156 thereby preventing the hundred dollar wheel from additional or further rotation. Likewise, as the ten dollar wheel 66 rotates and reaches zero the springs 172 will urge extension 174a into the slot 158a thereby preventing the ten dollar wheel from further rotation. Likewise, as remainder wheel 62, the dollar indicating wheel, rotates to the zero position, extension 174b will slip into and lock in slot 156b of shaft 74b thereby preventing further rotation of this wheel. A similar sequence of operation occurs with remainder indicating wheels 58 and 54. As a result of the slidable, pivotal mounting of the zero lock bar 156 the remainder wheels in downwardly decreasing amounts will be unaffected by the locking of the higher remainder wheel and each successive locking will still enable the remaining wheels to continue to rotate until these wheels also reach the zero point at which point the extensions 174, 174a, 174b, 174c, 174d lock into the respective slots thereby preventing further rotation of the remainder indicating wheels.

Referring specifically to FIG. 8 the remainder wheel indexing mechanism 176 is provided with an enlarged head portion 178 which portion is driven outwardly from the respective base portions of the remainder indicating wheels by means of a compression spring 180. The travel of the head of the indexing mechanism 176 is limited by means of a pin 182 which pin prevents the indexing mechanism from being advanced out of the slot which is formed in the remainder indicating wheel base for the purposes of advancing each successive remainder indicating wheel.

Remainder indicating wheel 54 is driven by rack 52 in a clockwise direction. Remainder indicating wheel 58 is driven in a counterclockwise direction by gear tooth slidable bar 56; the indicating wheel 62 is driven in a clockwise direction by rack 60; remainder indicating wheel 62 is driven in a clockwise direction by rack 60; remainder indicating wheel 66 is driven in a counterclockwise direction by rack 64 while remainder indicating wheel 73 is driven in a clockwise direction by rack 68. The cents wheel 54 is actuated by remainder wheel indexing mechanism 176d which is located upon the upper portion of the base of the remainder wheel indicator 74d. The ten cent wheel 58 is provided with a remainder wheel indexing mechanism 176c located about the middle of the base 74c of the remainder indicating wheel while indicating wheel 62 is provided with an indexing mechanism 176b at the lower portion of the base 74b of the remainder wheel indicating section. Further, remainder wheel 66 is provided with a remainder wheel mechanism 176a which is located at the upper portion of said remainder body 74a. Remainder wheel 74 is not provided with any remainder index mechanism devices for the reasons as will become apparent as the specification continues. Remainder indicating body 74d is provided with an indented portion about the central area of the remainder wheel body 74d while remainder wheel 74c is provided with an indented section along the lower edge thereof. Remainder indicating wheel 74b is provided with an indented portion adjacent the upper surface thereof.

In actual use the balance on deposit in the user's checking account will be indicated by the remainder wheels, as shown in FIG. 1 and also in FIG. 9 where the remainder in the depositor's account amounts to ninety-nine dollars and no cents ($99.00).

If the depositor were to draw a check in the amount of $25.50 the sequence of operations would be as follows. The drawer would activate the depression bar 32 thereby freeing the slides and the other mechanical components of the check writing and balance computing device. The depositor would then advance slide 48 down until numeral 2 appeared in the recessed window 26, as the slide were advanced to indicate 2 in the window area. Slide 64 with its rack would be driven downwardly rotating remainder indicating wheel 66 in a counterclockwise direction thereby bringing the balance shown in the remainder indicating window 30 to 7 for the dollar wheel. The depositor would then advance slide 46 downwardly until the numeral 5 appeared in the dollar column of the window area 26, and in so doing the dollar indicating wheel 62 would transfer from 9 to 4. The depositor would then actuate slide 44 to numeral 5 thereby moving the rack 56 downward which in turn would rotate remainder indicating wheel 58 in a counterclockwise position resulting in the balance remainder window showing 5. As remainder indicating wheel 58 was rotated in its counterclockwise direction, the indexing mechanism 176c would contact the notch portion of remainder indicating base section 74b and cam the remainder indicating wheel 74b clockwise one notch thereby changing the balance remaining from $74.00 to $73.00 while at the same time subtracting the .50 cents from the ten cent indicating wheel which has been at zero thereby leaving a remainder of $73.50 showing through the remainder indicating window 30. As a result of the varied heights of the remainder indicating wheel indexing mechanisms 176a, 176b, 176c and 176d it will be possible for the wheels to be rotated in the direction shown by the arrows without the indexing mechanism striking against one another causing the mechanism to jam. Further, the cutout portions of the base of the remainder indicating wheels are designed in such a manner as to allow the indexing mechanisms 176a, 176b, 176c and 176d to make a full rotation and only contact the appropriate remainder indicating wheels 74, 74a, 74b, 74c and 74d. Accordingly, indexing mechanism 176a will only serve to index remainder wheel 70 and will have absolutely no effect on remainder wheel 62 in view of the fact that the base 74b of remainder wheel 62 is provided with the inward cutout for the purpose of allowing the indexing mechanism to rotate about its axis without striking remainder indicating wheel 74b. Likewise, as indicating remainder wheel 62 is rotated about its axis, indexing mechansm 176b will only serve to contact remainder wheel 66 and will in no way affect remainder wheel 58 in view of the fact that remainder wheel 58 is provided with an inward cutout at the same elevation as in the indexing mechanism 176b. Likewise, indexing mechanism 176c extending from remainder indicating wheel 58 will only serve to contact the grooved portion of remainder indicating wheel 62 and will have no effect whatsoever on remainder indicating wheel 74d in view of the fact that remainder indicating wheel 74d is also provided with the cutout at the same elevation as in the indexing mechanism 176c.

Once the depositor has set the check writing and balance computing device at the desired total, for example $25.50, the remainder indicating wheel then shows a balance left in the account of $73.50. When the amount of the check to be written has been established and the user sees that he has sufficient funds remaining in the account the user inserts the check into the check receiving slot 160. After the check has been placed within the check receiving slot 160, the stamping bar 28 is then pressed downwardly thereby causing the check locating and securement pin to locate the check and maintain the same imposition and simultaneously by virtue of the action of the double arm lever 126 cause the check to be lifted up and brought into contact with the printing disc 144 which serves to emboss and print the amount for which the check is written upon the face of the check. The inking ribbon 140 which is above the check and below the printing discs imparts color to the embossed and printed letters for easy readability upon the check. After the check has been written, the user releases the depression bar 32 and the stamping bar 28 thereby allowing the removal of the check 162.

After the check has been removed the clearing bar 40 is then activated by pulling the same outwardly from the check printing and balance computing device which serves to reset the slides 44, 46, 48 and 50 to their normal positions as a result of the following of these linkages with the clearing pin 116 which is connected to the clearing bar extension lever 41.

Any time that the depositor seeks to add additional funds to his checking account it is merely necessary for the bank to reset the remainder wheels 54, 58, 62, 66 and 70 to indicate the mount of the deposit. The bank is able to reset the remainder wheels 54, 58, 62, 66, and 70 by opening a locked, hinged door (not shown) in the side wall of the case 22 adjacent remainder indicating wheel 70.

Although the device illustrated herein only provides for writing of checks up to the amount of $999.99 the same principle may be equally applied to a check writing and balance computing device having additional slide actuating means such as 42 and additional balance indicating wheels such as 54 with no change whatsoever in the mechanical operation or means of construction for the enlarged check writing and balance computing device.

Although these and other various changes and modifications may be made in the check writing and balance computing without departing from the spirit and scope of the present invention, it is intended that such obvious changes and modifications should be embraced by the appended claims.

Having thus described our invention, what is claimed as new and desired to be secured by Letters Patent, is:

1. A pocket balance certifier comprising a case having a first window and a second remainder window formed in the upper surface thereof, said case having a slot therein, stamping bar means extending into said slot and movable with respect to said case, said case having an opening therein for receiving a check beneath said stamping bar means, a plurality of slides located in said housing having the digits on the upper surface thereof, said slides being movable on either direction, said digits being visible through said first window, said slides having rack portions thereon, a depression bar extending through the upper surface of said case, said depression bar being operatively connected to said slides, said depression bar adapted to releaseably secure said slides in a predetermined preset position, horizontal remainder indicating wheels rotatably mounted within said case, having digits on the upper surface thereof, said indicating wheels cooperating with said racks, one way clutch means on said remainder indicating wheels controlling reverse rotation of said remainder indicating wheels, spring operated zero lock means cooperating with said remainder indicating wheels controlling rotation of said remainder indicating wheels past zero, said zero lock means being sequenced to operate in a decreasing numeral sequence, locking means and stamping means interconnected with said stamping bar means and said depression bar preventing movement of said slide and said remainder indicating means during the stamping of a check.

2. A pocket balance certifier according to claim 1, wherein a clearing bar is operatively connected to said slides for resetting said slides after the stamping of a check.

3. A pocket balance certifier according to claim 1, wherein a clearing bar is operatively connected to said slides, said slides and said rack portions being integrally formed, said clearing bar being manually operative to reset said slides and to set said remainder indicating wheels after the stamping of a check.

4. A pocket balance certifier in accordance with claim 1, wherein said remainder indicating wheels are rotatably mounted on a vertical axis paneled to the top surface of said case, said remainder indicating wheels being provided with indexing means engaging the adjoining remainder indexing wheel to sequence said adjoining remainder indicating wheel, said indexing means comprising an enlarged cylindrical head mounted on a cylindrical neck portion, said head being driven outwardly by a compression spring, and a limiting pin, said limiting pin limiting the outward travel of said head.

5. A pocket balance certifier according to claim 1, wherein said remainder indicating wheels are mounted on slotted vertical axles, said zero locking means having a plurality of extensions formed thereupon, said means releasably engaging said extensions within said slotted axles preventing rotation of said remainder indicating wheels after said wheels reach a predetermined position, said zero lock means pivotally mounted on one end thereof and mounted within a slotted track at the opposite end thereof, said extensions adapted to bear against said axle causing said extension to engage the slots in sequence as the axles on said remainder indicating wheels rotate, and means for resetting said remainder indicating wheels to coincide with a deposit made by the depositor.

References Cited

UNITED STATES PATENTS

| | | | |
|---|---|---|---|
| 476,588 | 6/1892 | Worthington | 235—140 |
| 718,195 | 1/1903 | Dement | 235—140 |
| 1,397,559 | 11/1921 | Stimson | 235—58 |
| 1,983,587 | 12/1934 | Abel | 235—58 |
| 1,989,805 | 2/1935 | Imber et al. | 235—58 |
| 2,541,463 | 2/1951 | Cummins | 235—74 |
| 2,594,566 | 4/1952 | Kesling | 235—140 |
| 2,804,265 | 8/1957 | Wilson et al. | 235—58 |

RICHARD B. WILKINSON, *Primary Examiner.*

S. A. WAL, *Assistant Examiner.*